(12) United States Patent
Castellanos et al.

(10) Patent No.: US 7,797,341 B2
(45) Date of Patent: Sep. 14, 2010

(54) DESENSITIZING DATABASE INFORMATION (75) Inventors: Maria G. Castellanos, Palo Alto, CA (US); Bin Zhang, Palo Alto, CA (US); Umeshwar Dayal, Palo Alto, CA (US); Ivo Jimenez, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 482 days.

(21) Appl. No.: 11/799,212

(22) Filed: Apr. 30, 2007

(65) Prior Publication Data

US 2008/0270370 A1    Oct. 30, 2008

(51) Int. Cl.
*G06F 17/30* (2006.01)
(52) U.S. Cl. ....................... 707/783; 707/785
(58) Field of Classification Search ........................ None
See application file for complete search history.

(56) References Cited

U.S. PATENT DOCUMENTS 7,477,741 B1 * 1/2009 Oakley ..................... 380/217

* cited by examiner

*Primary Examiner*—Baoquoc N To (57) ABSTRACT

In a method of preserving characteristics of desensitized database information for use in database management system benchmarking, at least one column of sensitive data from a database is accessed. The at least one column of sensitive data is sorted into a sorted data representation. Desensitized data is generated by sequentially mapping ascending different values of the sorted data representation to ascending desensitized values generated according to a strictly monotone increasing randomly generated function. The mapping results in a plurality of mapped desensitized values which are associated with the sorted data representation. The mapped desensitized values are unsorted into a desensitized database according to sorting information related to the sorted data representation. As a result of the unsorting, cardinalities of the at least one column of sensitive data are maintained within the desensitized database.

16 Claims, 7 Drawing Sheets

```
ACCESSING AT LEAST ONE COLUMN OF SENSITIVE DATA FROM A DATABASE.
310
          ↓
SORTING THE AT LEAST ONE COLUMN OF SENSITIVE DATA INTO A SORTED
DATA REPRESENTATION.
320
          ↓
GENERATING DESENSITIZED DATA BY SEQUENTIALLY MAPPING ASCENDING
DIFFERENT VALUES OF THE SORTED DATA REPRESENTATION TO
ASCENDING DESENSITIZED VALUES GENERATED ACCORDING TO A STRICTLY
MONOTONE INCREASING RANDOMLY GENERATED FUNCTION, WHEREIN A
RESULTING PLURALITY OF MAPPED DESENSITIZED VALUES ARE
ASSOCIATED WITH THE SORTED DATA REPRESENTATION.
330
          ↓
UNSORTING THE MAPPED DESENSITIZED VALUES INTO A DESENSITIZED
DATABASE ACCORDING TO SORTING INFORMATION RELATED TO THE
SORTED DATA REPRESENTATION, WHEREIN CARDINALITIES OF THE AT
LEAST ONE COLUMN OF SENSITIVE DATA ARE MAINTAINED WITHIN THE
DESENSITIZED DATABASE AS A RESULT OF THE UNSORTING.
340
```

| EMPLOYEE NUMBERS 411 | YEARS EMPLOYED 412 | SALARIES 413 | Table 410 |
|---|---|---|---|
| 82 | 10 | 20,000 | } 421 |
| 24 | 17 | 15,000 | } 422 |
| 223 | 5 | 52,000 | } 423 |
| 47 | 14 | 15,000 | } 424 |
| 12 | 25 | 100,000 | } 425 |
| 95 | 11 | 11,500 | } 426 |
| 198 | 6 | 14,000 | } 427 |
| 210 | 5 | 15,000 | } 428 |
| 29 | 17 | 70,000 | } 429 |

| EMPLOYEE NUMBERS 451 | EMPLOYEE LEVELS 452 | Table 450 |
|---|---|---|
| 47 | 11 | } 461 |
| 198 | 9 | } 462 |
| 219 | 3 | } 463 |
| 12 | 14 | } 464 |
| 240 | 4 | } 465 |

| DESENSITIZED EMPLOYEE NUMBERS 411A | YEARS EMPLOYED 412A | DESENSITIZED SALARIES 413A | Table 410A |
|---|---|---|---|
| 9 | 10 | 108 | 421A |
| 2 | 17 | 105 | 422A |
| 18 | 5 | 110 | 423A |
| 6 | 14 | 105 | 424A |
| 0 | 25 | 114 | 425A |
| 12 | 11 | 100 | 426A |
| 13 | 6 | 102 | 427A |
| 15 | 5 | 105 | 428A |
| 5 | 17 | 111 | 429A |

| DESENSITIZED EMPLOYEE NUMBERS 451A | EMPLOYEE LEVELS 452A | Table 450A |
|---|---|---|
| 6 | 11 | 461A |
| 13 | 9 | 462A |
| 16 | 3 | 463A |
| 0 | 14 | 464A |
| 20 | 14 | 465A |

```
ACCESSING SELECTED SENSITIVE DATA OF A DATABASE.
810
```

```
UTILIZING A STRICTLY MONOTONE INCREASING RANDOMLY GENERATED
FUNCTION IN DESENSITIZATION OF THE SELECTED SENSITIVE DATA INTO
DESENSITIZED DATA, SUCH THAT CARDINALITIES OF THE SELECTED
SENSITIVE DATA ARE PRESERVED IN THE DESENSITIZED DATA.
820
```

```
STORING THE DESENSITIZED DATA IN A DESENSITIZED DATABASE SUCH
THAT THE DESENSITIZED DATABASE REPLICATES A TABLE STRUCTURE OF
THE DATABASE.
830
```

FIG. 8

DESENSITIZING DATABASE INFORMATION

TECHNICAL FIELD

Embodiments of the present technology relate to database information. More specifically, embodiments of the present technology relate to desensitizing sensitive database information.

BACKGROUND

Database information desensitization is used to desensitize sensitive database data, such as personal data in employee or customer records, before the data is released to sources which should not have access to such data. Database information desensitization may also be used to desensitize sensitive information contained in part of a database query which is being released to a party. There are a variety of reasons why database information may need to be released to a party who does not require access to some elements of the information. One typical reason is that some data in a database and/or queries to a database might need to be released to an outside party for the purpose of conducting database testing that closely or exactly replicates the type of queries or operations that a company may perform upon the database data.

Several techniques for database information desensitization are known, such as: data replacement, data swapping, data anonymization, data randomization, and data encryption. For example, one way that desensitization is currently performed is by replacing sensitive database information with trivial non-useable data such as null values. An example of this would be replacing every social security number with a series of nine identical numbers such as 444-44-4444, or replacing every salary listed in a database with a single salary number, such as $10. Similarly, randomly generated numbers can be used to arbitrarily replace each salary, social security number, or other sensitive piece of data in a database and/or in a query. In another example, data entries are replaced by their class intervals or swapped within a single field in a records set. These methods of desensitization are effective to varying degrees in desensitizing or hiding the sensitive information of a database, but do not leave a database with data fields which can be used to validate queries nor do they leave queries that are applicable to the desensitized data. That is to say, database information is desensitized but relevant characteristics are destroyed, thus rendering the desensitized database and/or query virtually or completely useless for any database testing purpose such as benchmarking.

In another instance, a mathematical function (such as an nth degree polynomial) may be used to convert or encrypt sensitive information into obfuscated information. While this method may preserve some characteristics of the desensitized information, such that it may be useable in some manner for database benchmarking, it is not very secure. For instance, by analyzing a small subset of the converted information, the function used to convert or encrypt the information can be discovered. The information converting or encrypting process can then be reversed, thus revealing sensitive information, such as employee or customer information, which was thought to be desensitized.

As can be seen, current methods for desensitizing database information suffer from shortcomings which endanger the security of sensitive information released to an outside party or else destroy characteristics of the information which may be needed by an outside party in order to perform database testing. Thus a technology which addresses these shortcomings would be advantageous.

BRIEF DESCRIPTION OF THE DRAWINGS

The accompanying drawings, which are incorporated in and form a part of this specification, illustrate embodiments of the present technology for desensitizing database information and, together with the description, serve to explain principles discussed below.

The drawings referred to in this description should not be understood as being drawn to scale unless specifically noted.

DETAILED DESCRIPTION

Reference will now be made in detail to embodiments of the present technology for desensitizing database information, examples of which are illustrated in the accompanying drawings. While the subject matter is described in conjunction with various embodiments, it will be understood that they are not intended to limit the present technology to these embodiments. On the contrary, the present technology is intended to cover alternatives, modifications and equivalents, which may be included within the spirit and scope the various embodiments as defined by the appended claims. Furthermore, in the following detailed description, numerous specific details are set forth in order to provide a thorough understanding. However, the present technology may be practiced without these specific details. In other instances, well known methods, procedures, components, and circuits have not been described in detail as not to unnecessarily obscure aspects of the subject matter being described.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the described arts to most effectively convey the substance of their work to others skilled in their art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system.

Unless specifically stated otherwise as apparent from the following discussions, it is appreciated that throughout the present detailed description, discussions utilizing terms such as "accessing", "sorting", "generating", "unsorting", "parsing", "desensitizing", "storing", "exporting", "utilizing", "analyzing", "mapping", "overlaying", "performing", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical and virtual computers. Additionally, it should be understood that in embodiments of the present technology, one or more of the steps can be performed manually.

Overview of Discussion

The present technology desensitizes database information such as, database data and stored queries to a database. The present technology provides systems and methods for desensitizing sensitive database information while preserving characteristics of the information, such as selected cardinalities, which will allow the information to be relevantly used for database benchmarking. For example, while desensitizing sensitive database information, such as, for example two joined columns of sensitive data, embodiments described herein simultaneously preserve essential data characteristics which are required for conducting accurate and realistic benchmarking using the desensitized database information. Some examples of database benchmarking include database performance analysis and query optimization testing. Thus, embodiments described herein allow desensitization of a database and/or a set of database queries, such that an outside party may possess and utilize the desensitized database information for testing purposes without fear that sensitive information will be revealed.

Moreover, the desensitized data created by the methods and systems described herein is not intended to be invertible, rather the desensitization is a one-way process. Techniques described herein are also very different from data obfuscation techniques like data swapping and data anonymization, where data entries are, respectively, either replaced by their class intervals or swapped within a singe field in a records set. An issue with these obfuscation techniques of data swapping and data anonymization is that desired characteristics of the data set might not be preserved. This is also very different from the process of data encryption, which, by definition is required to be invertible with a decryption process that is matched to the encryption process. Additionally, the reversibility property (difficulty of reversing) of the desensitization techniques described herein is restricted by the requirement of preserving the selected characteristics. Randomization, as described herein, is applied to satisfy the desensitization requirements, but is constrained to preserve the selected characteristics. Another difference between typical data sensitization techniques and the data desensitization techniques described herein is that some information (such as ordering) that is meant to be derived from the selected characteristics cannot be removed from the data, but instead must be preserved during desensitization. Therefore, if such selected information is still considered to contain sensitive information after being desensitized in the manner described herein, it is recommended that either the techniques described herein not be used, or that the set of selected characteristics that are to be preserved be weakened so that sensitive information is no longer part of the selected characteristics.

Discussion will begin with a description of an example computer system environment with which, or upon which, embodiments of the present technology may operate. Discussion will proceed to a description of an example system for desensitizing database information. Components of this system will be generally described. Operation of the system and its components will then be described in conjunction with description of an example method of preserving characteristics of desensitized database information for use in database management system benchmarking, and further with description of a method of preserving cardinalities of desensitized database information. Various examples of database information and desensitized database information will be discussed in conjunction with the description of these methods in order to promote the understanding of the present technology.

Example Computer System Environment

Figure 1:
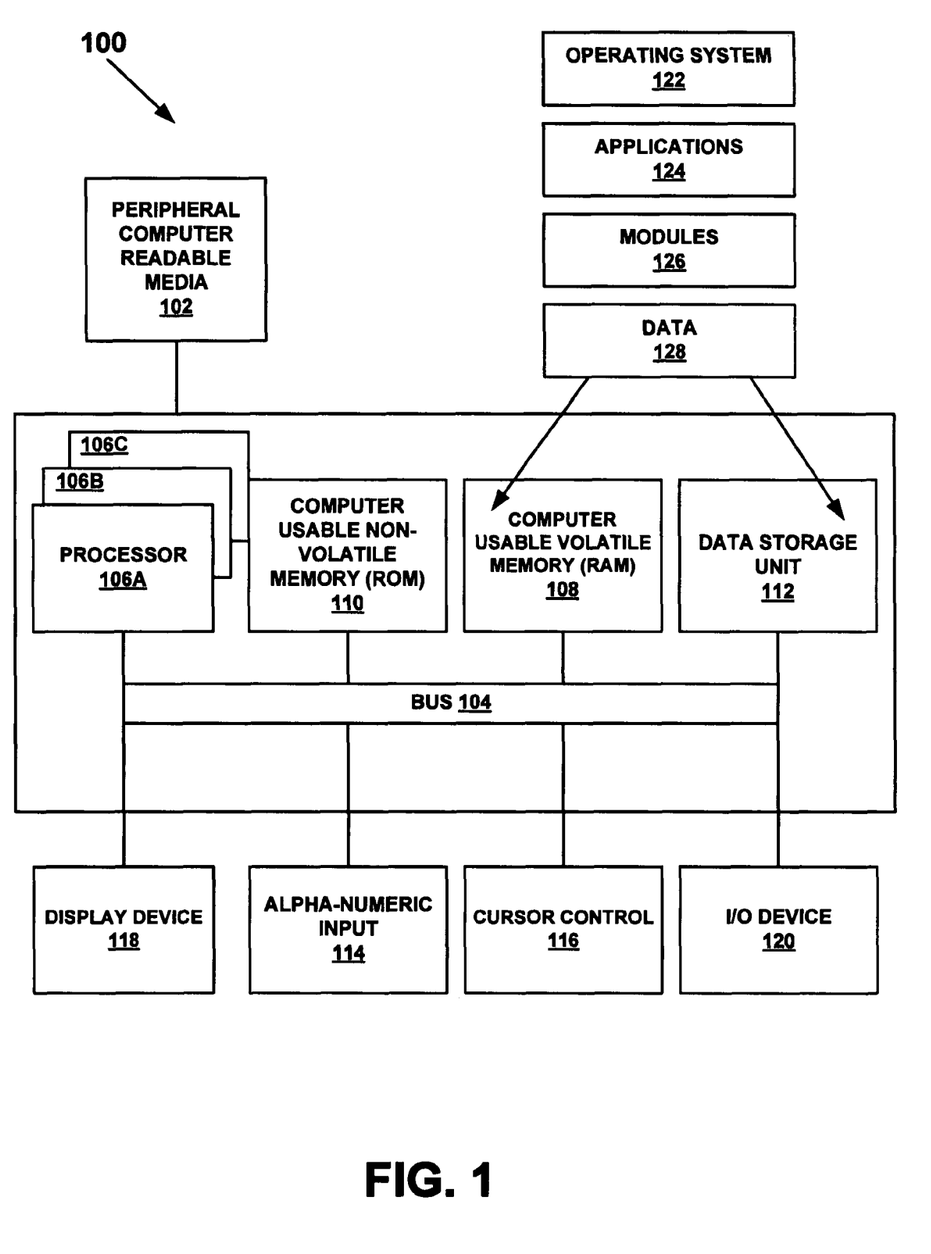
FIG. 1 is a diagram of an example computer system used in accordance with embodiments of the present technology.

With reference now to FIG. 1, portions of the present technology are composed of computer-readable and computer-executable instructions that reside, for example, in computer-usable media of a computer system. That is, FIG. 1 illustrates one example of a type of computer that can be used to implement embodiments, which are discussed below, of the present technology. FIG. 1 illustrates an example computer system 100 used in accordance with embodiments of the present technology. It is appreciated that system 100 of FIG. 1 is an example, and that the present technology can operate on or within a number of different computer systems including general purpose networked computer systems, embedded computer systems, optical computer systems, virtual computer systems, server devices, client devices, various intermediate devices/nodes, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors.

System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions.

System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 may be a liquid crystal device, cathode ray tube, plasma display device or other display device suitable for creating, presenting, or displaying graphic images and/or symbols or alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick, directional and input keys on a multimedia remote control, or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology is stored, for example, as an application 124 or module 126 in memory locations within RAM 108, computer readable media within data storage unit 112, and/or peripheral computer readable media 102.

System for Desensitizing Database Information

Figure 2:
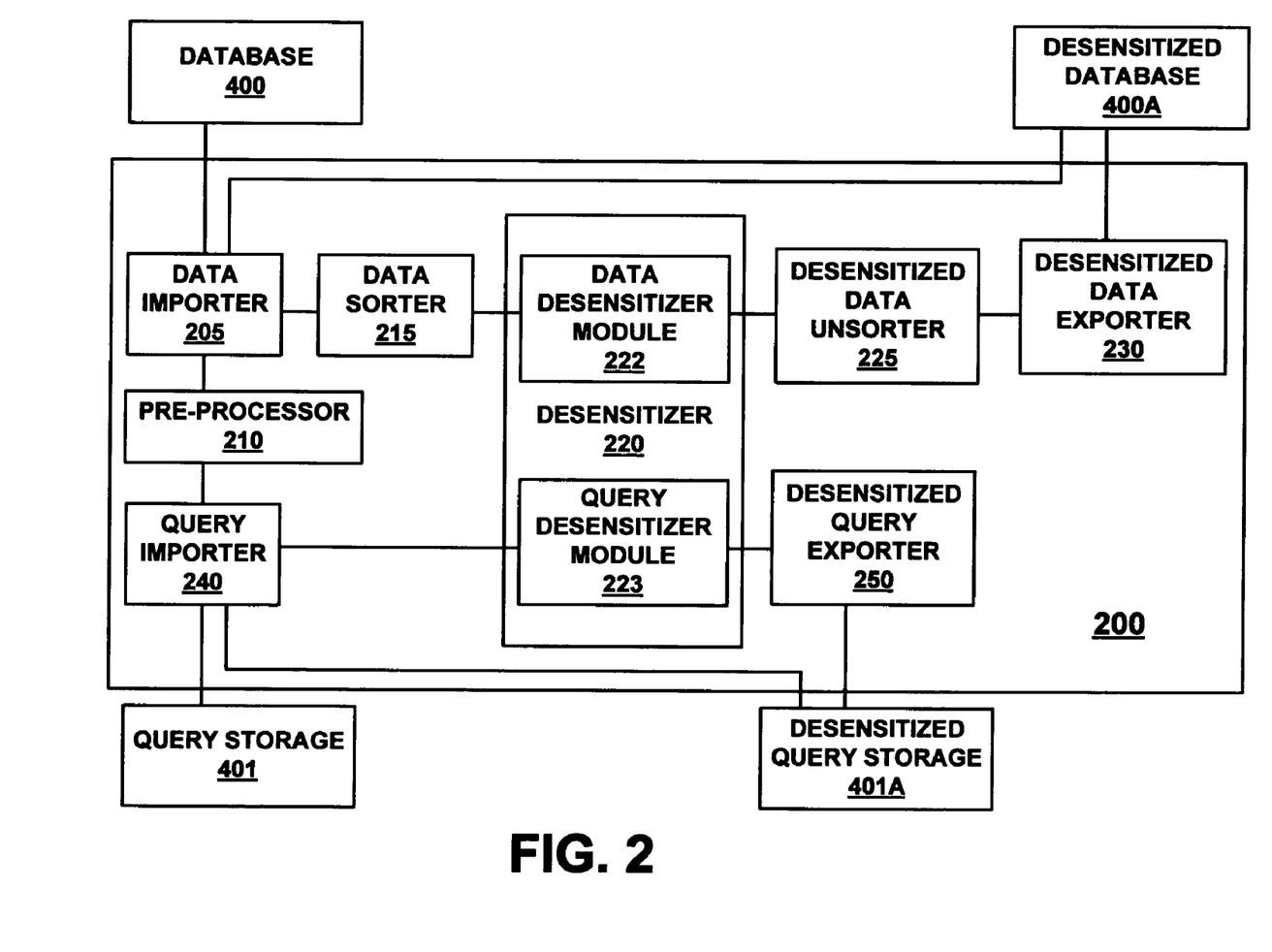
FIG. 2 is a block diagram of an example system for desensitizing database information, according to various embodiments.

With reference now to FIG. 2, a block diagram is shown of a system 200 for desensitizing database information. It is appreciated that system 200 illustrates one example embodiment, and that other configurations within the scope of the present technology are possible. As shown in FIG. 2, system 200 is comprised of a data importer 205, a pre-processor 210, a data sorter 215, a desensitizer 220, a desensitized data unsorter 225, a desensitized data exporter 230, a query importer 240, and a desensitized query exporter 250.

Data importer 205 is coupled with an example database 400, which is comprised of some amount of sensitive data such as one or more columns of sensitive data. Similarly, query importer 240 is coupled with an example query store 401, which is comprised of one or more stored database queries which have previously been performed upon the data of database 400.

Pre-processor 210, is coupled with data importer 205 and query importer 240. When utilized, pre-processor 210 acts through data importer 205 to access and/or import data and metadata of database, such as example database 400, so that the structure of the database may be analyzed. In some embodiments, pre-processor 210 acts to control data importer 205, such that joined columns of data are imported for contemporaneous desensitizing with the column or columns of data. As will be seen, such contemporaneous desensitizing allows the cardinalities across the joined columns to be preserved. In one embodiment, pre-processor 210 acts to control query importer 240, such that a query related to a sensitive column or columns of data is imported for contemporaneous desensitizing. As will be seen, such contemporaneous desensitization allows the cardinalities between the desensitized data and the desensitized query to be preserved as between their original counterparts.

Data sorter 215 is coupled with data importer 205, and is configured for sorting received data, such as sensitive data, into a sorted data representation. Desensitizer 220 is coupled with data sorter 215 and with query importer 240. In one embodiment, as shown in FIG. 2, desensitizer 220 is comprised of a data desensitizer module 222 and a query desensitizer module 223. It is appreciated, however that the functionalities of module 222 and/or module 223 may, in various embodiment be incorporated into desensitizer 220 without the inclusion of the respective separate module. In general, desensitizer module 220 converts sensitive information such as sensitive data or queries into desensitized information, while maintaining the set of selected characteristics, such as cardinalities of query outputs, and in some embodiments, other characteristics of the sensitive information in the desensitized information to which it is converted.

Data desensitizer module 222 desensitizes sensitive data using a strictly monotone increasing randomly generated function to convert the sensitive data into desensitized data, while preserving the selected characteristics, such as the cardinalities of all queries. Therefore, if the monotone property itself (or other properties that can be derived from this monotone property) is considered by the original owner of the data as sensitive information, then this desensitization method is not the right choice for the particular data set. Further description of the conversion of selected sensitive data into desensitized data will be discussed below. During the desensitization process, sensitive data is either replaced by desensitized data or mapped to desensitized data.

Desensitized data unsorter 225 is coupled with data desensitizer 220, and "unsorts" the desensitized data which has replaced or has been mapped to the sensitive data by data desensitizer 220. It is appreciated that herein, terms such as "unsort," "unsorted," and "unsorting" refer to the action or result of reversing a previously performed sorting process, not to data which has not been sorted. Desensitized data exporter 220 is coupled with desensitized data unsorter 225, and exports the "unsorted" desensitized data. For example, in one embodiment, desensitized data exporter 220 exports the unsorted desensitized data to a database (such as desensitized database 400A) that replicates the size and structure of the original database that the sensitive data was imported from.

Query desensitizer module 222 is coupled with query importer 240, and receives and desensitizes selected queries that are associated with data, such as joined columns of data, which are being desensitized. Such an associated query (or queries) is desensitized contemporaneously with the desensitization of the associated data, using the same values generated by the strictly monotone increasing randomly generated function. Desensitized query exporter 250 exports the desensitized query. For example, in one embodiment, desensitized query exporter 250 exports the desensitized query to a desensitized query store (such as desensitized query store 401A) where the desensitized query may be stored for use in benchmarking.

Operation of the Present System for Desensitizing Database Information

Figure 3:
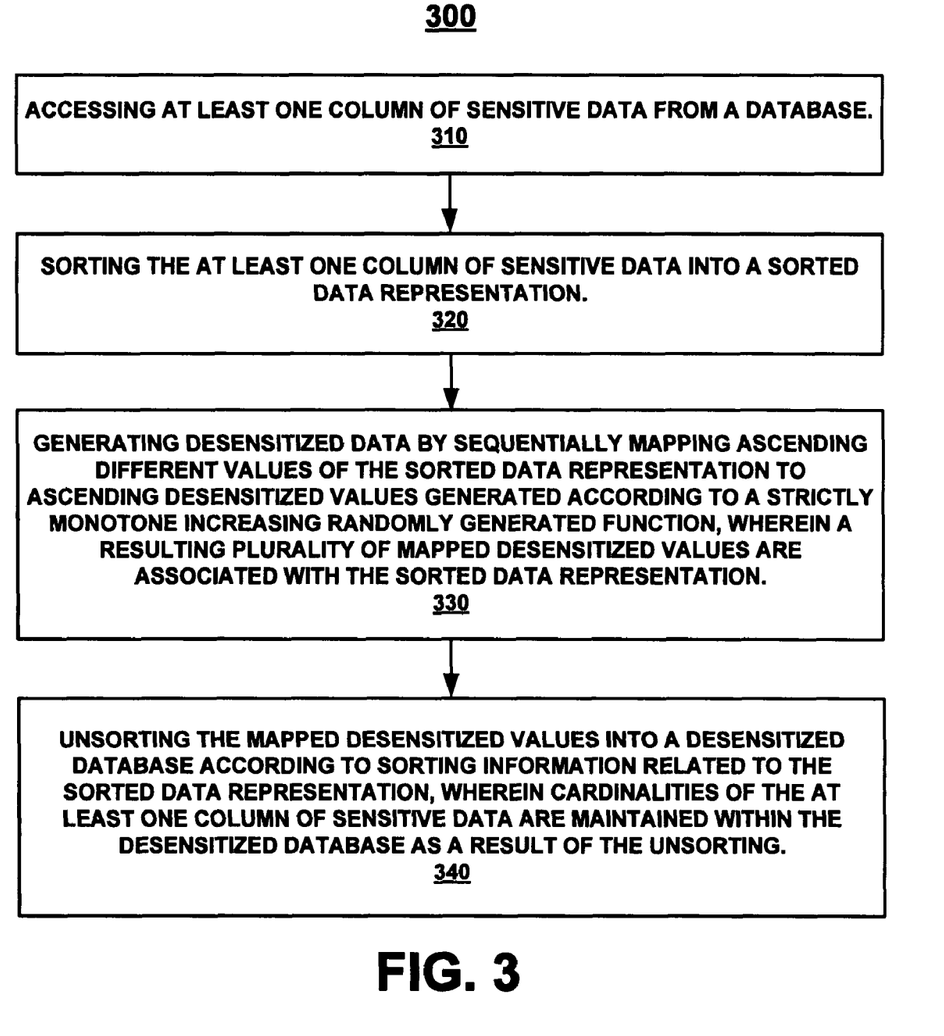
FIG. 3 is a flow diagram of an example method of preserving characteristics of desensitized database information, according to one embodiment.
Figure 8:
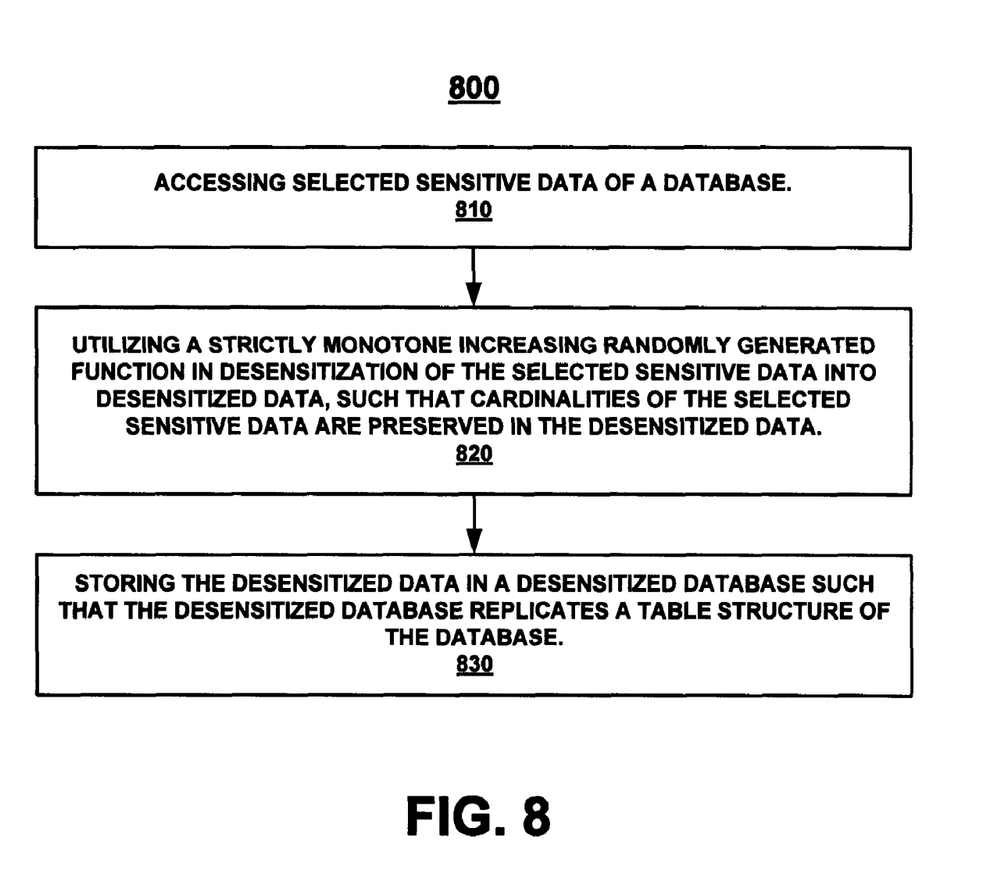
FIG. 8 is a flow diagram of an example method of preserving cardinalities of desensitized database information, according to one embodiment.

The following discussion sets forth in detail the operation of present technology through description of example embodiments. With reference to FIGS. 3 and 8, flow diagrams 300 and 800 each illustrate example steps used by methods and/or processes according to various embodiments described herein. Flow diagrams 300 and 800 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, and/or data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 300 and 800 such steps are examples. It is appreciated that embodiments described herein are well suited to performing various other steps or variations of the steps recited, that the recited steps may be performed in an order different than presented, and that not all of the recited steps may be performed in every embodiment.

Method of Preserving Characteristics of Desensitized Database Information for Use in Database Management System Benchmarking FIG. 3 is a flow diagram 300 of a method, according to one embodiment, of preserving characteristics of desensitized database information for use in database management system benchmarking. Reference will be made to FIG. 2 and FIGS. 4-7 to facilitate explanation of the operation of flow diagram 300.

At 310 of flow diagram 300, in one embodiment, at least one column of sensitive data is accessed. For example, in one embodiment, system 200 of FIG. 2 utilizes data importer 205 to import at least one column of sensitive data from a database, such as example database 400. Such sensitive data may include employee data such as salaries, phone numbers, employee numbers, social security numbers, and the like. Such sensitive data may also include other sensitive data, such as proprietary data.

Figure 4:
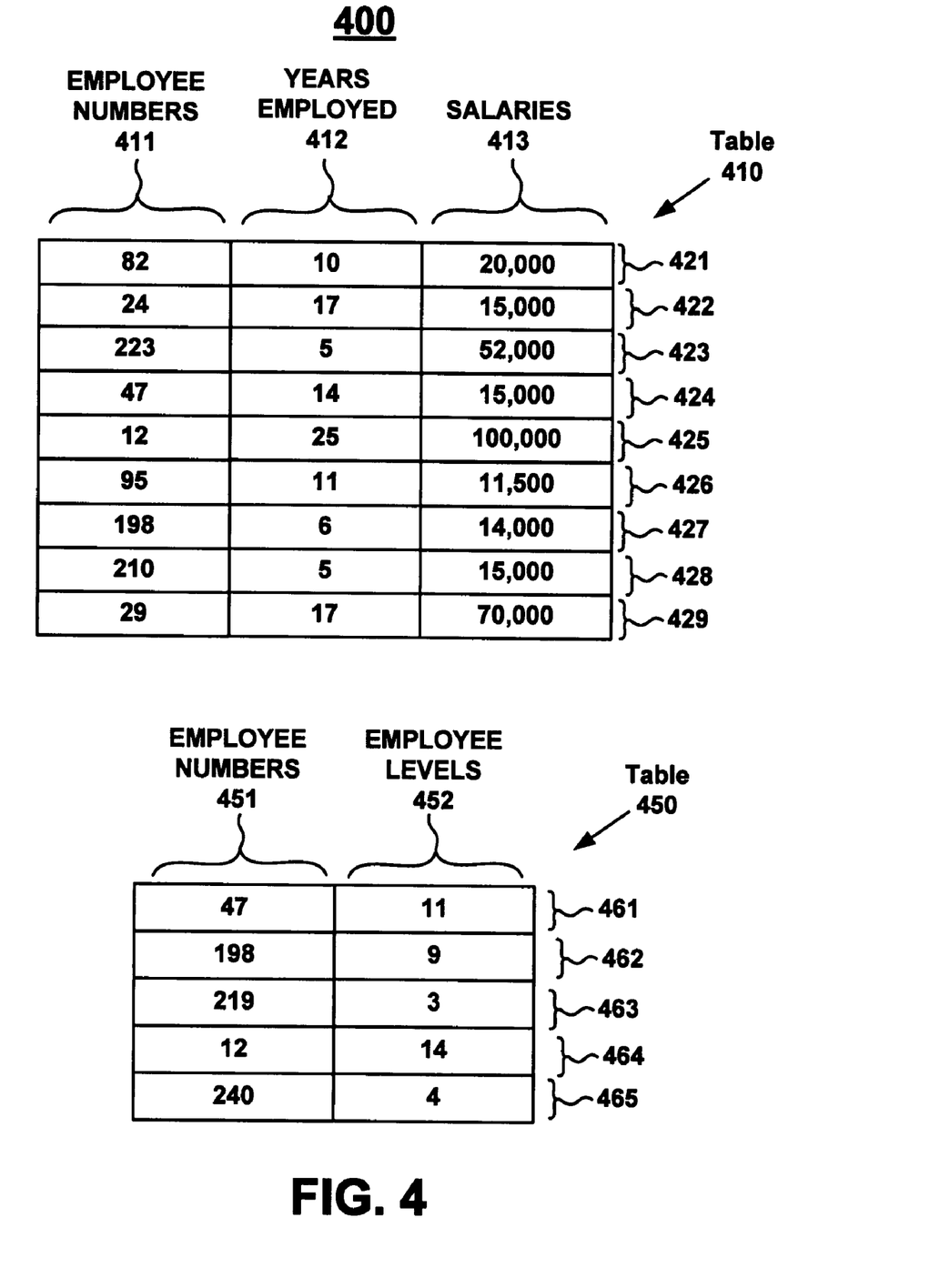
FIG. 4 represents an example database, which may be desensitized according to various embodiments.

FIG. 4 shows the contents and structure of example database 400, from which sensitive data may be accessed and desensitized, according to one embodiment. As shown in FIG. 4, example database 400 is comprised of two tables, table 410 and table 450. Although database 400 represents a very basic example of a database, it has been chosen to clearly illustrate concepts of the present technology.

Table 410 is comprised of three columns, column 411, column 412, and column 413. Each column (411, 412, and 413) is comprised of nine rows (421, 422, 423, 424, 425, 426, 427, 428, and 429). Column 411 contains "Employee Numbers," column 412 contains "Years Employed", and column 413 contains years "Salaries". In the examples illustrated herein, columns 411 and 413 are considered to be sensitive data, while column 412 is not considered to be sensitive data. Typically, such judgments, if made, are made by a user of system 200. Such definitions of what data is considered sensitive and what data is not considered sensitive may be input, in one embodiment, to pre-processor 210 for use in control of which data is accessed for desensitizing.

Table 450 is comprised of two columns, column 451 and column 452. Each column (451, 452) is comprised of five rows (461, 462, 463, 464, and 465). Column 451 contains "Employee Numbers" and column 452 contains "Employee Levels" data. In the examples illustrated herein, column 451 is considered to be sensitive data, while column 452 is not considered to be sensitive data.

In one embodiment, data importer 205 accesses and imports sensitive data from a database, such as database 400, so that such sensitive information may be desensitized by system 200. In some embodiments, this comprises accessing and importing all data of a database, while in other embodiments this comprises accessing and importing selected sensitive data which has been identified as sensitive, for instance by a user. In some embodiments, data importer 205 accesses and imports data for and/or under direction of pre-processor 210. Additionally, as shown in FIG. 2, in one embodiment, data importer 205 is coupled with a desensitized database, such as desensitized database 400A, for exporting imported data (such as one or more columns of data) which is determined, such as by a user or pre-processor 210, to require no desensitization.

In one embodiment, the step of accessing at least one column of sensitive data from a database comprises utilizing pre-processor 210 to accomplish pre-processing actions which determine one or more joining properties of the database being accessed, and then based upon this pre-processing determining which column or columns of data to access. For example, with respect to database 400, in one embodiment, pre-processor 210 analyzes the structure of database 400 and/or parses the queries of database 400 that are stored in query store 401A. In one such embodiment, pre-processor 210 acts through data importer 205 to access and/or import data and metadata of database 400 so that the structure of database 400 may be analyzed. This analysis is performed to determine to determine joining properties of database 400, such as which columns are joined to one another.

For example, a dataset is usually comprised of a number of tables (data files in tabular format such as tables 410 and 450). Some of the columns of these tables may share a common type of data under which two tables can be joined. For instance, if one table, 450 is the "Department Table" and another table, 410, is the "Employee Table," the "Employee Number" associated with an employee may be saved as a column in both the "Employee Table" 410 and the "Department Table" 450, and thus both columns are joined under their "Employee Numbers" columns. Following this example, based upon such pre-processing, pre-processor 210 is able to determine that sensitive data in column 411 is joined with sensitive data in column 451, and that sensitive data of column 413 is not joined with any other columns of database 400. Joining properties are often designed into a database and thus many of such joining properties, such as joins between one or more columns of data, can be discovered or discerned by analyzing the structure of the database.

In one embodiment, pre-processor 210 also acts through query importer 240 to access and/or import queries from query store 401 so that such queries may be parsed to determine joining properties of database 400. For example, by analyzing the structure of a query, pre-processor 210 may discern a joining property, such as an equijoin between two columns of data, which may exist but not be included in the database structure. Thus, in one embodiment, pre-processor 210 parses all stored queries in query store 401 to search out major types of queries, such as point or range queries only with equijoins. These queries are identified so that the literals of the predicates of these queries may be contemporaneously desensitized during desensitization of columns of data which these queries are directed to. This allows these major types of queries to have the same cardinality as the original queries on the sensitized data.

It is appreciated that non-equijoins, such as predicates with inequalities involving two or more columns of data are not considered in this example. Such characteristics may be preserved; however preserving the cardinalities of such non-equijoin queries is more complicated than simply preserving the order in each column via a monotone property. To support the more general case of having both equijoins and non-equijoins, even more data characteristics have to be preserved. This particular example has been selected as, in practice, the use of equijoins in database queries is far more dominant, by a significant margin, than use of non-equijoins.

According to results of this pre-processing action, in one embodiment, pre-processor 210 directs data importer 205 to access and import a single column of sensitive data (such as column 413) from database 400, if the single column of sensitive data is not joined to any column of data of database 400. Likewise, in one embodiment, as a result of this pre-processing action, pre-processor 210 directs data importer 205 to access and import a plurality of columns of sensitive data (such as columns 411 and 451) from database 400, if the plurality of columns of sensitive data are joined. This allows these joined columns of data to be desensitized contemporaneously, thus preserving selected cardinalities which exist between the plurality of joined columns of data.

At 320 of flow diagram 300, in one embodiment, at least one column of sensitive data is sorted into a sorted data representation. For example, in one embodiment, system 200 of FIG. 2 utilizes data sorter 215 to sort sensitive data into a sorted data representation. In one embodiment, the sorted data representation may be an ordering of the values of the data, such as from lowest to highest. In another embodiment, the sorted data representation may comprise a histogram or data similar to a histogram which orders values of the data and indicates a number of occurrences of each duplicated value within the data. Such sorting may be performed, for example under the direction of a script or by utilizing the functionality of a database management system (DBMS) which data sorter 215 is able to access.

TABLE 1

Example SQL Parameterizing Statement select column_name, count (*)
from table_name
group by column_name
order by column_name Table 1 illustrates an example SQL (Structured Query Language) parameterizing statement that data sorter 215 uses, in one embodiment, to generate a sorted data representation from data received from data importer 205. Use of such an SQL parameterizing statement to sort received data into a sorted data representation exploits the power of SQL and allows a DBMS to handle resource management. Note that the parameterizing statement shown in Table 1 will return a table with all the different values of the column sorted in ascending order, along with the number of occurrences of each different value. In one embodiment, database information, such as row identifiers of the sensitive data, is maintained within the sorted data or by data sorter 215, to assist in unsorting desensitized data which is mapped to or replaces the sensitive data. In another embodiment, a hash function or table is maintained by data sorter 215 so that the data sorting processed can be reversed to unsort desensitized data which is mapped to or replaces the sensitive data. This sorted data is then saved and/or forwarded to data desensitizer 220 for desensitization.

For example, if the sensitive data in the rows of column 411 is sorted, in one embodiment, the sorted data arrangement would be arranged in this order: 12, 24, 29, 47, 82, 95, 198, 210, and 223. Likewise, if the sensitive data of the rows of columns 411 and 451 are imported and sorted contemporaneously, in one embodiment, the sorted data arrangement would be comprised of data values arranged in the following order: 12, 24, 29, 47, 82, 95, 198, 210, 219, 223, and 240.

Figure 5:
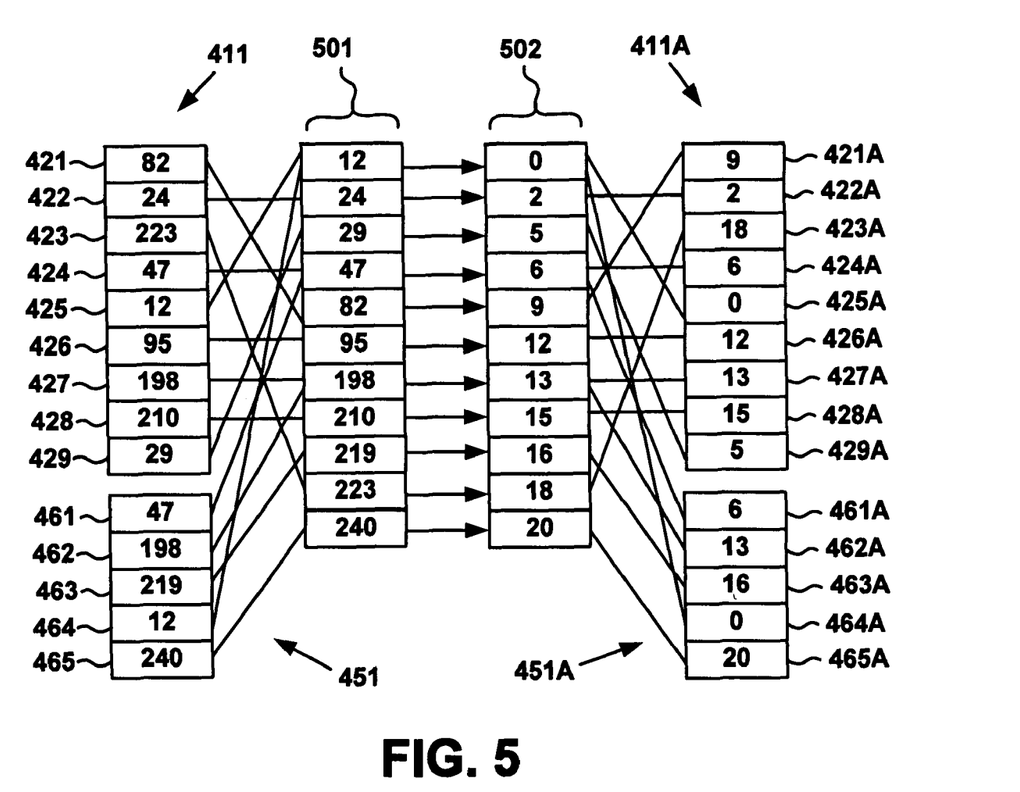
FIG. 5 illustrates an example of desensitizing selected database information, according to an embodiment.

FIG. 5 shows the Employee Numbers of columns 411 and 451 sorted into a sorted data arrangement 501, according to one embodiment. In sorted data arrangement, 501, row number information accompanies each value of sorted data arrangement 501. Thus, for example, in one embodiment the sorted employee number "12" is associated with both row 425 of column 411 and row 464 of column 451 and carries row identification information related to both rows.

At 330 of flow diagram 300, in one embodiment, desensitized data is generated by sequentially mapping ascending different values of the sorted data representation to ascending desensitized values generated according to a strictly monotone increasing randomly generated function. This results in a plurality of mapped desensitized values which are associated with the sorted data representation. For example, in one embodiment, system 200 of FIG. 2 utilizes data desensitizer module 222 of desensitizer 220 to perform this desensitization. Data desensitizer module 222 desensitizes sensitive data using a strictly monotone increasing randomly generated function to convert the sensitive data into desensitized data, while preserving the cardinalities of the selected sensitive data within the desensitized data.

For example, with reference to desensitized data structure 501 of FIG. 5, in one embodiment, data desensitizer 222 picks an initial value to be associated with a first ordered value of the employee numbers shown in sorted data structure 501. For example, the value of "0" is picked as an initial value, $u_1$, to be the desensitized value associated with employee number "12", $v_1$. This initial value, $u_1$, can be intentionally selected to be a particular value or can be randomly generated. Data desensitizer 222 generates each next desensitized value by first generating a positive random number $r_k > 0$ and allowing $u_k = u_{k-1} + r_k$, $k = 2 \ldots K$. The value $r_k$ is selected independently for each desensitized value generated. This is an example of a strictly monotone increasing randomly generated function.

Thus, in some embodiments, as shown by column 502 of FIG. 5, data desensitizer 222 generates a sequence of ordered random numbers starting with an initial value, "0" in this example, to which a succession of positive random numbers are recursively added to generate successive ascending numbers of the ordered random numbers. Data desensitizer 222 maps the initial value, in this case "0", to a lowest value in the sorted data representation, in this case employee number "12". As shown in column 502 of FIG. 5, data desensitizer 222 then sequentially maps each remaining ascending different value of the sorted data representation (column 501) to a sequentially ascending different value of the sequence of ordered random numbers (column 502).

In one embodiment, each random number $r_k$ is selected randomly with no restriction other than it be greater than zero. In another embodiment, as shown by column 502 of FIG. 5, the value $r_k$ in the succession of positive random numbers used in the strictly monotone increasing randomly generated function is selected from a bounded range of numbers. Thus, for example, in column 502 each value of $r_k$ utilized for the generation of the ordered random numbers has been selected from a range of number which includes only the values of 1, 2, and 3. As can be seen there are many possible variations of this strictly monotone increasing randomly generated function which allow the increments between selected desensitized values to be perturbed in many ways.

The result of generating desensitized values in this fashion is that cardinalities are preserved between the sensitive data and the desensitized data. That is to say, the smallest desensitized value will be mapped to the smallest sensitive value, while the largest desensitized value will be mapped to the largest sensitive value. It follows then that all values between the smallest and largest sensitive values will also map to desensitized values that are appropriately sequentially located between the smallest and largest desensitized values. These concepts and properties are graphically illustrated in FIG. 6.

Figure 6:
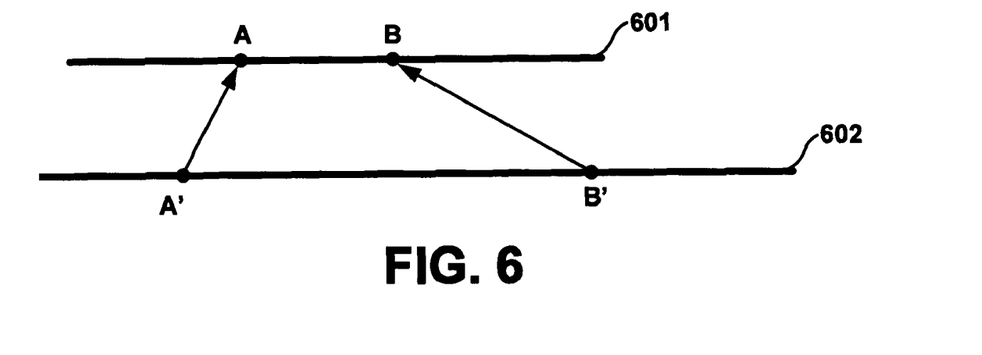
FIG. 6 represents bounds of database information relative to bounds of a desensitized version of the database information, according to an embodiment.

FIG. 6 represents bounds of database information relative to bounds of a desensitized version of the database information, according to an embodiment. In FIG. 6, line 601 represents a range of database data arranged from the smallest value on the left to the largest value on the right. Line 602 represents a desensitized version of the range of data of line 601. The range of data on line 602 has been desensitized according to a strictly monotone increasing randomly generated function as described herein. Range 602 is arranged with a smallest desensitized value on the left and a largest desensitized value on the right. Thus, if value A' is a desensitized value from range 602 which is mapped from an original value A from range 601, it follows that any desensitized value smaller than A' will be mapped from a value in range 601 which is smaller than A. Likewise, any desensitized value larger than A' will be mapped from a value in range 601 which is larger than A. Further, for any two desensitized values A' and B' from range 602 which map from values A and B in range 601, all desensitized values between A' and B' will map from values in range 601 that are between A and B.

Referring again to 330 of flow diagram 300, in one embodiment, generating a sequence of ordered random numbers such as the random numbers of column 502 (FIG. 5) further comprises overlaying the sequence of ordered random numbers with a linear mapping. By overlying the sequence of ordered random numbers with a linear mapping, one or more other data characteristics of the at least one column of sensitive data are preserved within the sequence of ordered random numbers. For example, in various embodiments (if allowed by privacy protection policies) this technique can be used to additionally preserve characteristics of the one or more columns of sensitive data within the desensitized data. Such data characteristics include, but are not limited to: a maximum value, a minimum value, a variance, or a mean value.

In a database, two high dimensional distributions are considered in the same class, having the same copula, if one distribution can be mapped into the other one and vice-versa by strictly monotone increasing mappings of the (one-dimension) marginal distributions. The copulas capture the highly dimensional relationship between columns of data free from the shape of the marginal distributions of the data. Based upon this theory, the data desensitization described herein applies monotone mappings to the marginal distributions; therefore the copula of the data distribution, the high dimensional relationship, remains the same.

Keeping the copula the same guarantees that, on all corresponding high dimensional query boxes, such as queries with linear or inequality constraints, the cardinality of the query on the original data and the query on the corresponding desensitized data are always the same. Two-dimensional cases provide a good example of this. For example, two distributions have the same copula if stretching the horizontal and vertical dimensions (possibly non-linearly) can make the two distributions look the same. Since embodiments described herein, map individual columns by strictly monotone increasing random generated functions, the copula of the high dimensional distribution of each table (such as table 410 or table 450) is preserved. This means that the cardinalities in any rectangular range in the original data are preserved in the new mapped desensitized rectangular range of the data. This property also guarantees that the cardinality of rectangular range queries with more that one equijoins (multiple table joins) is also preserved.

At 340 of flow diagram 300, in one embodiment, the mapped desensitized values are unsorted into a desensitized database according to sorting information related to the sorted data representation. Following the desensitization and the unsorting, cardinalities of the at least one column of sensitive data are maintained within the desensitized database as a result of the unsorting.

In one embodiment, system 200 utilizes desensitized data unsorter 225 to unsort the desensitized data which has replaced the sensitive data or has been mapped to the sensitive data by data desensitizer 220. Unsorting reverses the sorting process that created the sorted representation of the sensitive data. Thus, if the sensitive data came from one column of a database, the desensitized data will now be unsorted into appropriate rows of an identical column in place of the respective rows of sensitive data that have been mapped to or replaced by the desensitized data. The desensitized data is unsorted according to sorting information related to the sorting of the sensitive data into the sorted data representation. For example, in one embodiment, row identifiers of the sorted data are utilized to unsort the desensitized data to proper rows of a column or columns. Similarly, in one embodiment, a hash function, table, or script utilized to perform data sorting is further utilized to accomplish the unsorting by reversing the sorting process.

With reference again to FIG. 5, in one embodiment, desensitized data unsorter 225 unsorts the desensitized data of column 502 into the proper rows (421A, 422A, 423A, 424A, 425A, 426A, 427A, 428A, and 429A) of column 411 and the proper rows (461A, 462A, 463A, 464A, and 465A) of column 451. In one instance, this is done by utilizing row identifier information which was preserved for each sorted data point during the sorting process that was used by data sorter 215 to create sorted data representation 501. Though this unsorting has been described as utilizing a row identifier associated with one or more data points in the sorted data representation to unsort a mapped desensitized value associated with the one or more data points, it is appreciated that other means of unsorting may be utilized, by reversing the process that was used to accomplish the sorting. For example, in one embodiment, desensitized data unsorter 225 utilizes a hash function related to the creation of the sorted data representation to accomplish the unsorting.

In one embodiment, desensitized data exporter 230 then exports the unsorted desensitized data, such as the desensitized data in columns 411A and 451A of FIG. 5, to a database which replicates the size and structure of the original database. For example, as shown in FIG. 2, the desensitized data is unsorted and then exported for storage in desensitized database 400A, which replicates the size and structure of database 400. Thus after sensitive data from one or more columns of database 400 is converted into desensitized data, desensitized data exporter 230 exports the desensitized version of those one or more columns. This can comprises exporting the desensitized data into desensitized database 400A, where the desensitized data may be stored for use in benchmarking. It is appreciated that in one embodiment, the functionality of desensitized data exporter 230 may be incorporated in another portion of system 200, such as desensitized data unsorter 225.

Figure 7:
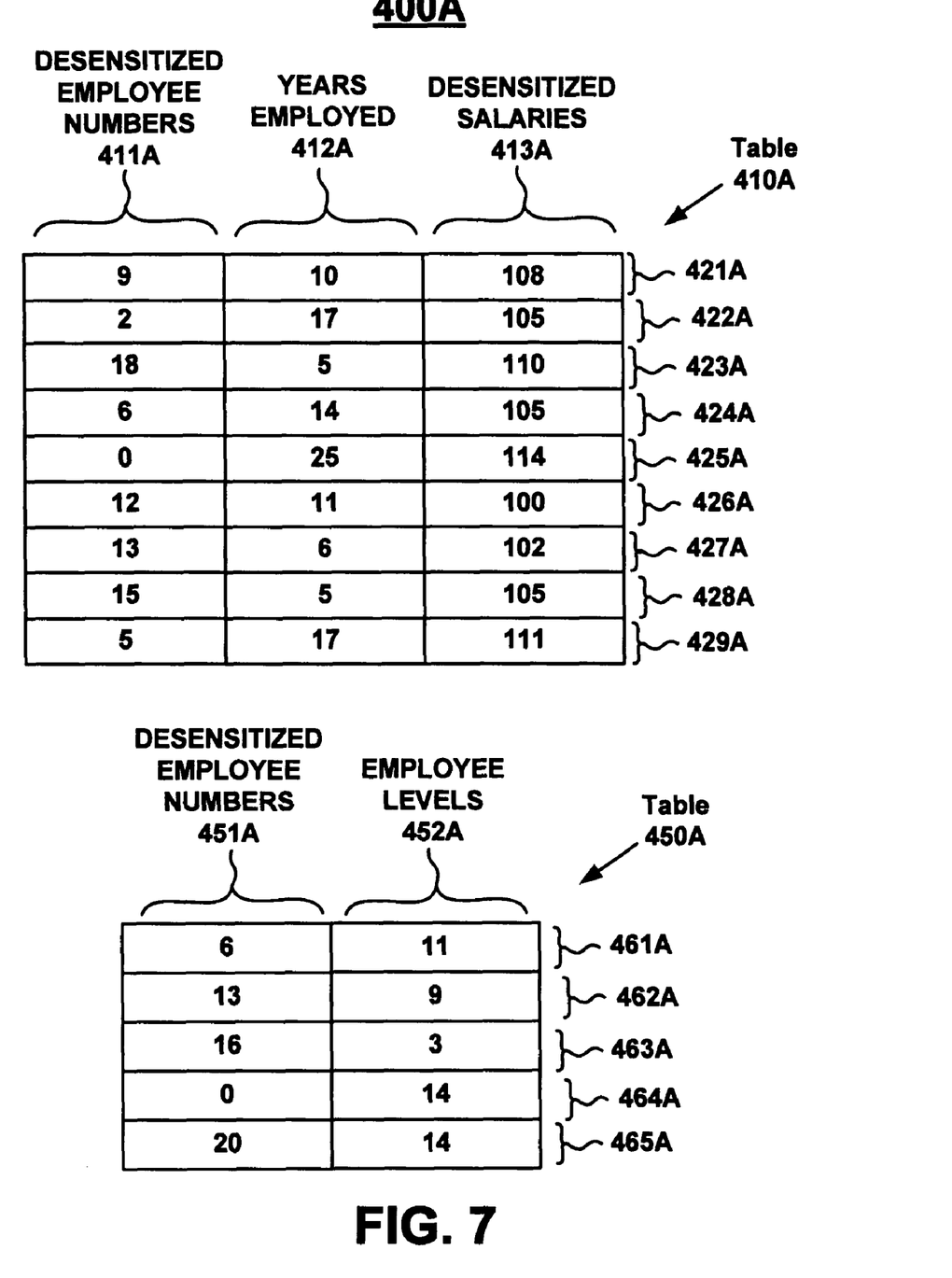
FIG. 7 shows a desensitized database created from the database shown in FIG. 4, according to one embodiment.

FIG. 7 shows a desensitized database 400A created from database 400 of FIG. 4, according to one embodiment. A comparison of database 400 and desensitized database 400A shows that the databases have the same structure. Table 410A of desensitized database 400A replicates the structure of table 410 of database 400. Table 410A is comprised of three columns 411A, 412A, and 413A, which respectively replicate the structure of columns 411, 412, and 413. Each column (411A, 412A, 413A) is comprised of nine rows (421A, 422A, 423A, 424A, 425A, 426A, 427A, 428A, and 429A). Column 412A contains a replication of the non-sensitive data of column 412. Column 411A contains "Desensitized Employee Numbers" that were generated from the sensitive employee numbers of column 411. Likewise, column 413A contains "Desensitized Salaries" that were generated from the sensitive salaries of column 413.

Similarly, table 450A is comprised of two columns, column 451A and column 452A, which respectively replicate the structure of columns 451 and 452. Each column (451A, 452A) is comprised of five rows (461A, 462A, 463A, 464A, and 465A). Column 451A contains "Desensitized Employee Numbers" which were generated from the sensitive employee numbers of column 451. Column 452A contains non-sensitive "Employee Levels" data which has been replicated from column 452.

With reference again to flow diagram 300, in one embodiment the described method further comprises parsing one or more stored queries to the database which is being desensitized. The one or more queries are parsed to determine if any stored query contains a predicates involving the at least one column of sensitive data which is being desensitized. For example, in system 200, query importer 240 is coupled with an example query store 401, which is comprised of one or more stored database queries which have previously been performed upon the data of database 400. Typically, the queries of query store 401 have been saved for use in benchmarking operations performed upon a database, such as database 400. For purposes of illustration herein, it may be assumed that the queries of query store 401 are queries previously performed upon database 400. As such, the one or more queries of query store 401 may be comprised of predicates which reference or reveal sensitive information regarding the data which they query. Additionally, one or more of the queries of query store 401 may be comprised of information regarding joins between columns of data in database 400.

In one embodiment, query importer 240 accesses and imports queries from query store 401 so that such the imported queries may be parsed for joining properties and/or desensitized by system 200. In some embodiments, this comprises accessing and importing all of the queries of query store 401, while in other embodiments this comprises accessing and importing certain queries which have been identified, for instance by a user, as referencing sensitive data. In some embodiments, query importer 240 accesses and imports queries for and/or under direction of pre-processor 210. As shown, in FIG. 2, in one embodiment, query importer 240 is coupled with desensitized query store 401A for exporting queries which are determined, such as by pre-processor 210, to require no desensitization.

In one embodiment, in response to determining that a stored query contains a predicate involving at least one column of sensitive data, the sensitive data of the predicate is desensitized in an identical manner to like sensitive data of the at least one column of sensitive data. This results in the creation of a desensitized query. For example, query desensitizer module 222 receives and desensitizes selected queries that are associated with data, such as joined columns of data, which are being desensitized. Such an associated query (or queries) is desensitized contemporaneously with the desensitization of the data, using the same values generated by the strictly monotone increasing randomly generated function. This contemporaneous desensitization of selected queries, such as point or range queries with equijoins to the data being desensitized, allows the cardinalities between the query and the sensitive data to be preserved between the desensitized data and the desensitized query. For example, in one embodiment, if a query contained a predicate which referenced a particular range of "employee numbers" in two joined columns of data, such as columns 411 and 451, the predicate of that query would be desensitized contemporaneously with the sensitive data of those columns of data so that cardinality of the referenced range of employee numbers is maintained.

In one embodiment, after a query is desensitized it is exported for use in a benchmarking operation involving the database. In one embodiment, desensitized query exporter 250 exports the desensitized query to a desensitized query store, where the desensitized query may be stored for use in benchmarking. For example, with reference to FIG. 2, desensitized query exporter 250 exports a desensitized query to desensitized query store 401A, where it is be stored for use in benchmarking with database 400A. Thus, with reference to FIGS. 4, 5 and 7, in one embodiment a query that referenced a range of employee numbers between 12 and 240 would be desensitized to reference a range of employee numbers between 0 and 20.

With reference again to flow diagram 300, in one embodiment the described method further comprises utilizing the desensitized database and a desensitized query to benchmark performance of a portion of a database management system. In one embodiment, this comprise exporting the desensitized database information (queries and data) to be used, for example by a vendor, to benchmark a portion of a database management system such as testing the performance of a database engine, performing query optimization testing, and or performing database performance analysis. Such benchmarking with database information desensitized by the techniques described herein is useful, because tasks commonly carried out by a vendor's potential customer can be tested and evaluated upon desensitized real-world database data and with desensitized real-world database queries that have been previously used by the potential customer. This results in realistic and reliable benchmarking data which can be presented to the potential customer for evaluation.

Method of Preserving Cardinalities of Desensitized Database Information

FIG. 8 is a flow diagram 800 of a method, according to one embodiment, of preserving cardinalities of desensitized database information. Reference will be made to FIG. 2, 4-7, and elements of flow diagram 300 of FIG. 3 in the explanation of flow diagram 800.

At 810 of flow diagram 800, in one embodiment, selected sensitive data of a database is accessed. As previously described in conjunction with 310 of flow diagram 300, this comprises accessing one or more columns of sensitive data which is/are selected in accordance with the results of a pre-processing action. For example, in one embodiment, data importer 205 accesses and imports a single column of sensitive data of the database, when, according to the results of pre-processing performed by pre-processor 210, the column of sensitive data is not joined to any column of data of the database that is being desensitized. Similarly, in another embodiment, data importer 205 accesses and imports a plurality of joined columns of data of the database, when one of the plurality of joined columns comprises sensitive data. The plurality of joined columns are accessed and imported for contemporaneous desensitization if, in response to a pre-processing action performed by pre-processor 210, it is determined that the plurality of joined columns are joined to one another according to a joining property identified in a parsed query or in the structure of the database.

At 820 of flow diagram 800, in one embodiment, a strictly monotone increasing randomly generated function is utilized in desensitization of the selected sensitive data into desensitized data. During this desensitization, cardinalities of the selected sensitive data are preserved in the desensitized data.

In one embodiment, as previously described in conjunction with 320 of flow diagram 300, this desensitization comprises sorting the selected sensitive data into a sorted data representation of data containing n different values. In one embodiment, this sorting is performed by data sorter 215 in one of the manners previously described herein. Column 501 of FIG. 5 shows an example of selected data (contents of column 410) which has been sorted into a sorted data representation containing n values. As previously described, this sorted data representation may be an ordering of values, may be a histogram, may be resemble a histogram, or may contain information typically associated with a histogram (such as a number of occurrences of each particular different sensitive value that is included in the sorted data representation).

In one embodiment, as previously described, 330 of flow diagram 300, this desensitization also comprises using a strictly monotone increasing randomly generated function to generate a sequence of n ordered random numbers. The n different values are then mapped to the n ordered random numbers in an increasing fashion. As previously described, in one embodiment data desensitizer module 222 of desensitizer 220 generates the n ordered random numbers and then maps them to the n different values. Column 502 of FIG. 5 shows an example of n ordered numbers which data desensitizer module 222 generated according to a strictly monotone increasing randomly generated function. As shown in FIG. 5, data desensitizer module 222 has also mapped the n ordered numbers of column 502 to the n values of the sorted data representation of column 501.

Additionally, as previously described, when the n ordered random numbers are generated, the generating process may also include overlaying the sequence of n ordered random numbers with a linear mapping to preserve a particular data characteristic of the selected sensitive data. For example, in some embodiments, data desensitizer module 222 offsets, scales, or both offsets and scales the range of the n ordered random numbers in order to preserve a characteristic of the selected sensitive data, such as, but not limited to: a maximum value, a minimum value, a mean value, or a variance.

At 830 of flow diagram 800, in one embodiment, the desensitized data is exported to a desensitized database such that the desensitized database replicates a table structure of the database that the sensitive data was accessed from. As previously described, desensitized data exporter 230 exports desensitized data. In one embodiment, this comprises exporting the desensitized data to a desensitized database (such as desensitized database 400A) which replicates the structure of the database (such as database 400) that sensitized data was accessed and imported from. Database 400A of FIG. 7, represents a desensitized database which replicates the structure of database 400 (which contains some sensitive information).

In one embodiment, as previously described in conjunction with 340 of flow diagram 300, this exporting of desensitized data involves unsorting the desensitized data prior to exporting it. For example, in one embodiment, the unsorting involves using sorting information related to the sorted data representation to unsort the mapped n ordered random numbers. Once unsorted the desensitized data may then be exported, for example, to a desensitized database as a desensitized version of the selected sensitive data. As previously described, in one embodiment, desensitized data unsorter 225 uses sorting information such as row identifiers, hash functions, tables, or scripts to reverse the sorting process. Columns 411A and 451A of FIG. 5 illustrate data which desensitized data unsorter 225 has unsorted from the column of desensitized data represented by column 502.

With reference again to flow diagram 800, in one embodiment the described method further comprises accessing a stored query to the database when the stored query comprises a predicate involving a data point or data range of the selected sensitive data. For example, this includes a query such as a point query or a range query which contains an equijoin related to the selected sensitive data. The predicate is then desensitized in an identical manner to desensitization of the data point or data range to which it is related. As a result, a desensitized query is created which preserves cardinality of the stored query with respect to the selected sensitive data. This desensitized query is then exported. For example, the desensitized query may be exported for use in a benchmarking operation involving a desensitized database. As previously described, in one embodiment, query importer 240 accesses and imports such a query from a query store, such as query store 401, for desensitization by query desensitizer module 223. Once desensitized, the desensitized query is then exported. For example, in one embodiment, desensitize query exporter 250 exports the desensitized query to desensitized query store 401A.

Although the subject matter of the present technology for desensitizing database information has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of preserving characteristics of desensitized database information for use in database management system benchmarking, said method comprising:
  with a computer system:
    accessing at least one column of sensitive data from a database;
    sorting said at least one column of sensitive data into a sorted data representation;
    generating desensitized data by sequentially mapping ascending different values of said sorted data representation to ascending desensitized values generated according to a strictly monotone increasing randomly generated function, wherein a resulting plurality of mapped desensitized values are associated with said sorted data representation;

unsorting said mapped desensitized values into a desensitized database according to sorting information related to said sorted data representation, wherein cardinalities of said at least one column of sensitive data are maintained within said desensitized database as a result of said unsorting;

parsing a stored query to said database to determine if said stored query contains any predicates involving said at least one column of sensitive data;

in response to said stored query containing a predicate involving said at least one column of sensitive data, desensitizing sensitive data of said predicate in an identical manner to like sensitive data of said at least one column of sensitive data, such that a desensitized query is created; and exporting said desensitized query for use in a benchmarking operation involving said database.

2. The computer-implemented method as recited in claim 1, further comprising:

utilizing said desensitized database and said desensitized query to benchmark performance of a portion of a database management system.

3. The computer-implemented method as recited in claim 1, wherein said accessing at least one column of sensitive data from a database comprises:

analyzing a structure of said database as part of a pre-processing action; parsing a plurality of stored queries to said database as part of said pre-processing action; and accessing a single column of sensitive data from said database if, according to results of said pre-processing action, said single column of sensitive data is not joined to any column of data of said database.

4. The computer-implemented method as recited in claim 3, wherein said accessing at least one column of sensitive data from a database further comprises:

accessing a plurality of columns of sensitive data from said database to preserve cardinalities of an equijoin if, according to results of said pre-processing action, said plurality of columns of sensitive data are joined.

5. The computer-implemented method as recited in claim 1, wherein said generating desensitized data by sequentially mapping ascending different values of said sorted data representation to ascending desensitized values generated according to a strictly monotone increasing randomly generated function comprises:

generating a sequence of ordered random numbers starting with an initial value to which a succession of positive random numbers are recursively added to generate successive ascending numbers of said ordered random numbers;

mapping said initial value to a lowest value in said sorted data representation; and sequentially mapping each remaining ascending different value of said sorted data representation to a sequentially ascending different value of said sequence of ordered random numbers.

6. The computer-implemented method as recited in claim 5, wherein said generating a sequence of ordered random numbers starting with an initial value to which a succession of positive random numbers are recursively added to generate successive ascending numbers of said ordered random numbers comprises: selecting said succession of positive random numbers from a bounded range of numbers.

7. The computer-implemented method as recited in claim 5, wherein said generating a sequence of ordered random numbers starting with an initial value to which a succession of positive random numbers are recursively added to generate successive ascending numbers of said ordered random numbers further comprises:

overlaying said sequence of ordered random numbers with a linear mapping such that a data characteristic of said at least one column of sensitive data to is preserved within said sequence of ordered random numbers.

8. The computer-implemented method as recited in claim 1, wherein said unsorting said mapped desensitized values into a desensitized database according to sorting information related to said sorted data representation comprises:

utilizing a row identifier associated with a data point in said sorted data representation to unsort a mapped desensitized value associated with said data point.

9. The computer-implemented method as recited in claim 1, wherein said unsorting said mapped desensitized values into a desensitized database according to sorting information related to said sorted data representation comprises:

utilizing a hash function related creation of said sorted data representation to accomplish said unsorting.

10. A computer-readable storage medium having computer-executable instructions for performing a method of preserving cardinalities of desensitized database information, said method comprising:

accessing selected sensitive data of a database, said accessing selected sensitive data of said database comprising accessing a column of sensitive data of said database, wherein said column of sensitive data is not joined to any column of data of said database;

utilizing a strictly monotone increasing randomly generated function in desensitization of said selected sensitive data into desensitized data, such that cardinalities of said selected sensitive data are preserved in said desensitized data; and exporting said desensitized data to a desensitized database such that said desensitized database replicates a table structure of said database; and accessing a stored query to said database, said stored query comprising a predicate involving a data point of said selected sensitive data;

desensitizing said predicate in an identical manner to desensitization of said data point, such that a desensitized query is created which preserves cardinality of said stored query; and exporting said desensitized query.

11. The computer-readable storage medium of claim 10, wherein said accessing selected sensitive data of said database further comprises:

performing a pre-processing action to determine a joining property of said database; and accessing a plurality of joined columns of data of said database, wherein said plurality of joined columns are joined to one another according to said joining property, and wherein one of said plurality of joined columns comprises sensitive data.

12. The computer-readable storage medium of claim 10, wherein said utilizing a strictly monotone increasing randomly generated function in desensitization of said selected sensitive data into desensitized data comprises:

sorting said selected sensitive data into a sorted data representation of data containing n different values;

utilizing said strictly monotone increasing randomly generated function to generate a sequence of n ordered random numbers; and mapping said n different values to said n ordered random numbers in an increasing fashion.

13. The computer-readable storage medium of claim 12, wherein said utilizing said strictly monotone increasing randomly generated function to generate a sequence of n ordered random numbers further comprises:

overlaying said sequence of n ordered random numbers with a linear mapping to preserve a data characteristic of said selected sensitive data.

14. The computer-readable storage medium of claim 12, wherein said exporting said desensitized data to a desensitized database such that said desensitized database replicates a table structure of said database comprises: utilizing sorting information related to said sorted data representation to unsort said mapped n ordered random numbers for export to said desensitized database as a desensitized version of said selected sensitive data.

15. A database information desensitization system, said system comprising:

a computer system comprising:

a data importer configured for accessing selected sensitive data of a database; a data sorter coupled with said data importer, said data sorter configured for sorting said selected sensitive data into a sorted data representation;

a desensitizer coupled with said data sorter, said desensitizer comprising a data desensitizer module configured for utilizing a strictly monotone increasing randomly generated function in desensitization of said selected sensitive data into desensitized data, such that cardinalities of said selected sensitive data are preserved in said desensitized data;

a desensitized data unsorter coupled with said data desensitizer, said desensitized data unsorter configured for unsorting said desensitized data according to sorting information related sorting of said selected sensitive data;

a data exporter coupled with said desensitized data unsorter, said data exporter configured for storing unsorted desensitized data in a desensitized database, wherein said desensitized database replicates a table structure of said database;

a query importer coupled with said desensitizer, said query importer configured for accessing a stored query to said database, said stored query comprising a predicate related to said sensitive data; and said desensitizer further comprising a query desensitizer module configured for desensitizing said stored query into a desensitized query such that cardinality between said stored query and said sensitive data is maintained between said desensitized query and said unsorted desensitized data.

16. The system of claim 15 wherein said computer system further comprises:

a pre-processor coupled with said data importer and said query importer, said pre-processor configured for analyzing a structure of said database and parsing a plurality of stored queries to said database to determine a joining property related to sensitive data of said database, such that joined ranges of sensitive data are identified for contemporaneous desensitization.

* * * * *